(12) United States Patent
Sugiyama et al.

(10) Patent No.: US 6,816,223 B2
(45) Date of Patent: Nov. 9, 2004

(54) LIQUID CRYSTAL DISPLAY ELEMENT (75) Inventors: Takashi Sugiyama, Tokyo (JP); Yoshihisa Iwamoto, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 17 days.

(21) Appl. No.: 10/774,992

(22) Filed: Feb. 9, 2004

(65) Prior Publication Data
US 2004/0165136 A1 Aug. 26, 2004

(30) Foreign Application Priority Data
Feb. 21, 2003 (JP) ........................................ 2003-044262

(51) Int. Cl.[7] .................... G02F 1/141; G02F 1/1337
(52) U.S. Cl. ...................... 349/143; 349/130; 349/129
(58) Field of Search ................................ 349/129, 130, 349/143

(56) References Cited

U.S. PATENT DOCUMENTS

| | | | | |
|---|---|---|---|---|
| 5,309,264 A | * | 5/1994 | Lien et al. | 349/143 |
| 6,285,431 B2 | * | 9/2001 | Lyu et al. | 349/143 |
| 6,529,255 B1 | * | 3/2003 | Sekiguchi | 349/113 |
| 6,650,390 B2 | * | 11/2003 | Sakamoto et al. | 349/143 |

* cited by examiner

Primary Examiner—Toan Ton
(74) Attorney, Agent, or Firm—Carella, Byrne, Bain, Gilfillan, et al.; Elliot M. Olstein; William Squire (57) ABSTRACT The following constitution provides a vertically oriented liquid crystal display element of higher quality having almost uniform visibility in any direction attained by improving obliquely viewed visibility. The liquid crystal display element comprises a pair of substrates, transparent electrodes having predetermined patterns formed on the respective substrates, vertical orienting membranes respectively formed on the transparent electrodes and rubbed in a predetermined direction and a liquid crystal layer consisting of the liquid crystal molecules sandwiched by the substrates. The substrates are arranged such that respective transparent electrodes face each other. Series of nearly rectangular slits are formed on the respective transparent electrodes by removing portions of the electrodes in a display area formed by the electrodes. Series of the slits on one and other transparent electrodes are alternately arranged in a normal direction to a longitudinal direction of series of the slits, when the substrates are viewed vertically.

13 Claims, 6 Drawing Sheets

LIQUID CRYSTAL DISPLAY ELEMENT

BACKGROUND OF THE INVENTION

1. Field of the Invention

The present invention relates to a vertically oriented liquid crystal display element.

2. Brief Description of the Related Art

Figure 11A:
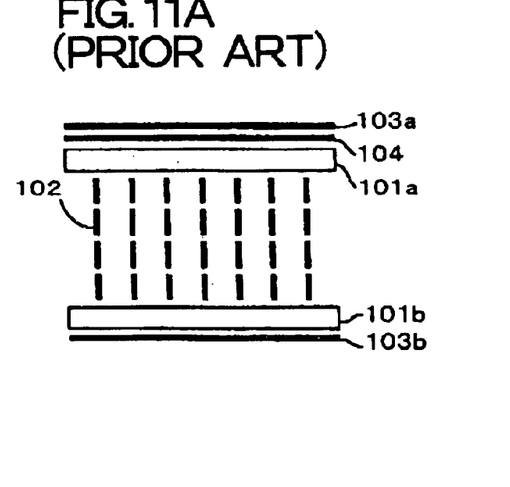
FIG. 11A is a side view and FIG. 11B is a plan view.
Figure 11B:
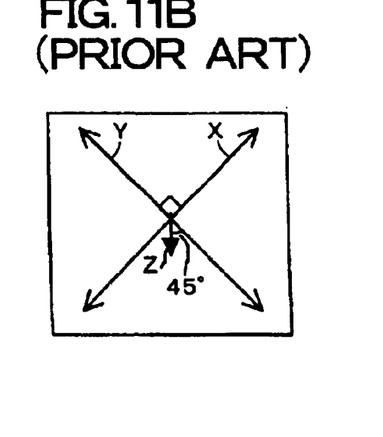

FIGS. 11A and 11B are drawings illustrating an arrangement of a typical vertically oriented liquid crystal display element (hereinafter referred as "LCD element"). FIG. 11A is a side view and FIG. 11B is a plan view.

Reference characters "101a" and "101b" in FIG. 11A are an upper glass substrate and a lower glass substrate and liquid crystal molecules 102 are sandwiched in between. On inner surfaces of both glass substrates, transparent electrodes (not shown in FIG. 11A) for driving liquid crystal molecules are formed. Reference characters "103a" and "103b" are polarizing plates and a reference character "104" is a visual angle compensation film. In FIG. 11B, a reference character "X" is a light transmission axis of the upper polarizing plate 103a, a reference character "Y" is a light transmission axis of the lower polarizing plate 103b and reference character "Z" is a tilting direction of the liquid crystal molecules 102.

In the LCD element, a liquid crystal cell consisting of the vertically oriented liquid crystal molecules, is arranged between the polarizing plates 103a and 103b arranged in a cross Nicol relation each other such that the tilting direction Z and the light transmission axis X of the polarizing plate 103a form an angle of 45 degree, and the tilting direction Z and the light transmission axis Y of the polarizing plate 103b also form an angle of 45 degree. The tilting direction Z of the liquid crystal molecules is controlled by a pre-tilted angle, which is attained when vertically orienting membranes (not shown in FIG. 11A) applied and baked on the glass substrates are treated, for example, are rubbed in a predetermined direction. In addition, a visual angle compensation film 104 is inserted between the upper glass substrate 101a and the upper polarizing plate 103a In order to improve obliquely viewed visibility of the LCD element.

A uniaxial optical film having an optical axis normal to a film plane and having a negative double refractive index [=(a refractive index in the film plane)–(a refractive index in the optical axis)] is employed as the visual angle compensation film 104. The visual angle compensation film 104 can be arranged at one side or both sides of the liquid crystal cell. A suitable retardation value of the visual angle compensation film 104 is approximately in a range from one third to the same retardation value of the liquid crystal cell. "Retardation value" is an index defined as follows: (a difference between a refractive index on the film plane and a refractive index in a normal direction to the film plane)×(a thickness of the film). If the visual angle compensation films 104 are arranged on both sides of the liquid crystal cell, a combined retardation value "with retardation values of both films should be adjusted in the above-mentioned range.

The above-mentioned LCD element is proposed by the same inventors as inventors of the present invention.

Another LCD element, for example, Japanese patent registered No. 3108768 proposes an electrode arrangement where transparent electrodes on the upper and lower glass substrates are partially removed, so as to form slits in the electrodes. And the slits on the upper and lower electrodes are alternately arranged when the electrodes are vertically viewed. Other LCD element, for example, Japanese patent registered No. 3324926 proposes another electrode arrangement where elongated slits are respectively formed in pairs on an upper substrate and a lower substrate.

Figure 12:
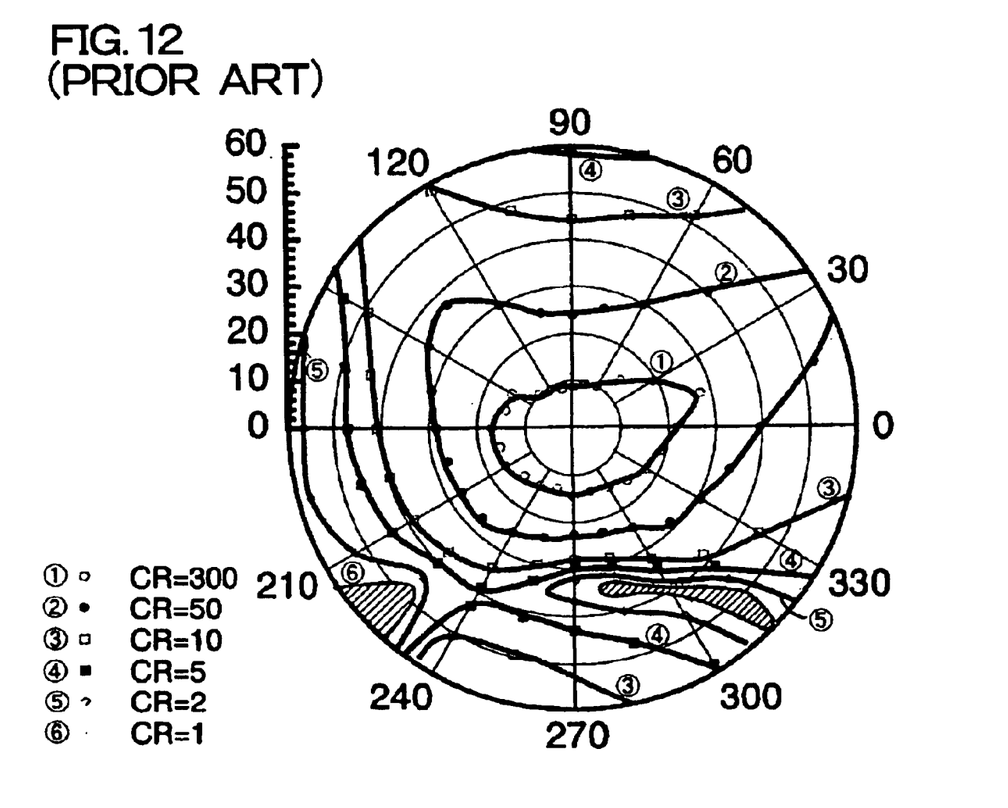
FIG. 12 is a chart illustrating obliquely viewed visibility of the LCD element shown in FIG. 11.

Since liquid crystal molecules in the above-mentioned LCD elements are tilted in one direction, obliquely viewed visibility of these LCD elements is not improved as shown in FIG. 12 even when visual angle compensation films are combined.

In FIG. 12, digits around a most outer circle are viewing directions projected on a horizontal plane. Namely, "0" means, a viewing direction from the right side and "180" means a viewing direction from the left side. Concentric circles (0 to 60) are angles formed between the viewing directions and a normal line to the LCD element, namely, "0" means a viewing direction normal to the LCD element and "60" means a viewing direction having an angle of 60 degree against the normal line. A reference character "CR" in the drawing means a ratio of a bright transmission rate/a dark transmission rate (a contrast value) in respective viewing directions. Which means the larger a CR value is, the clearer a displayed image in the LCD element is.

FIG. 12 indicates the obliquely viewed visibility of the above-mentioned LCD element In a tilting direction of the liquid crystal molecules (in this case in a 6 o'clock direction) is deteriorated such that contrast values In some area are less than 1, in other words, inverted contrast areas are formed (hatched areas in FIG. 12).

SUMMARY OF THE INVENTION

The present invention is carried out in view of the above-mentioned problems in order to provide a vertically oriented LCD element of higher quality by improving obliquely viewed visibility so as to obtain almost uniform visibility viewed from any direction.

The following arrangements by the present invention can provide the LCD element mentioned above.

(1) A liquid crystal display element comprising: a pair of substrates; transparent electrodes having predetermined patterns formed on the respective substrates; vertical orienting membranes respectively formed on the transparent electrodes; and a liquid crystal layer consisting of the liquid crystal molecules sandwiched by the substrates, wherein: pair of the substrates are arranged such that: respective transparent electrodes face each other; series of the nearly rectangular slits are formed on respective transparent electrodes by removing portions of the electrodes in a display area formed by the electrodes; and series of the slits on one and other transparent electrodes are alternately arranged in a normal direction to a longitudinal direction of series of the slits, when the substrates are viewed vertically.

(2) The liquid crystal display element according to (1), wherein: a width of the slits in the normal direction to the longitudinal direction of the slits is set more than 10 μm, but less than 30 μm.

(3) The liquid crystal display element according to (1), wherein: a width of the slits in the normal direction to the longitudinal direction of the slits is set 2.5 times more than a thickness of the liquid crystal layer.

(4) The liquid crystal display element according to (1), wherein: a horizontal distance between two neighboring alternately arranged slits in the normal direction to the longitudinal direction of the slits is set more than 10 μm, but less than 60 μm.

(5) The liquid crystal display element according to (1), wherein: a horizontal distance between two neighboring alternately arranged slits in the normal direction to the longitudinal direction of the slits is set more than the width of the slits, but less than 60 μm.

(6) The liquid crystal display element according to one of (1) to (5), wherein: the display area is a segment display type area.

(7) The liquid crystal display element according to one of (1) to (5), wherein: the display area is a dot-matrix display type area driven by a simple matrix driving method.

(8) The liquid crystal display element according to one of (1) to (5), wherein: the display area is a area combined a segment display type area and a dot-matrix display type area driven by a simple matrix driving method.

(9) The liquid crystal display element according to one of (1) to (5), wherein: the display area is a dot-matrix display type area driven by an active matrix.

(10) The liquid crystal display element according to (7) or (8), wherein: slits both ends of one dot in a normal direction to the longitudinal direction of the slits are formed on the electrode arranged normal to the longitudinal direction of the slits.

(11) The liquid crystal display element according to (9), wherein: outermost slits in the normal direction to the longitudinal direction of the slits are formed on a common electrode facing a certain pixel electrode.

(12) The liquid crystal display element according to (1), wherein: the slit is divided into a plurality slits In the longitudinal direction of the slit.

BRIEF DESCRIPTION OF THE DRAWINGS

FIGS. 1A and 1B show a basic structure of the LCD element by the present invention.

FIGS. 5A and 5B show a structure of embodiment 1 by the present invention.

FIGS. 11A and 11B show a basic structure of a conventional vertically oriented LCD element.

DETAILED DESCRIPTION OF PREFERRED EMBODIMENTS

Hereinafter embodiments by the present inventions are explained as referring to the drawings.

The vertically oriented LCD element by the present invention is arranged in the following manner. A liquid crystal layer is sandwiched by a pair of substrates on which transparent electrodes with predetermined patterns for driving the liquid crystal layer are formed. Series of roughly rectangular slits are formed on the respective electrode by removing portions of the electrodes in a display area constituted by the pair of the electrodes on the substrates. When the LCD element is vertically viewed, series of the rectangular slits of respective electrodes are alternately arranged in a normal direction to a longitudinal direction of the slits in the display area.

Figure 1A:
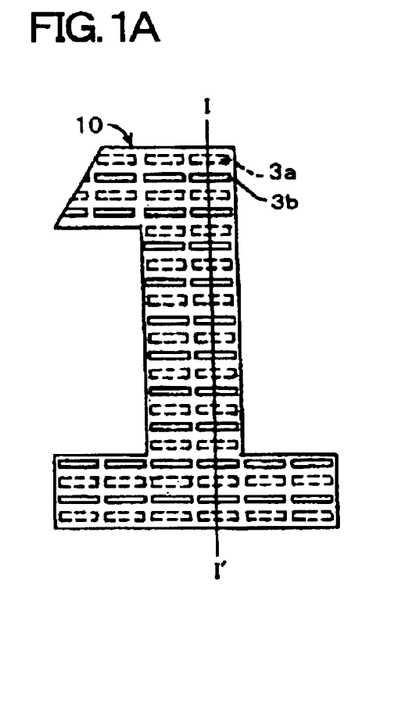
FIG. 1A is a plan view and FIG. 1B is a cross-sectional view cut along line I–I' in FIG. 1A.
Figure 1B:
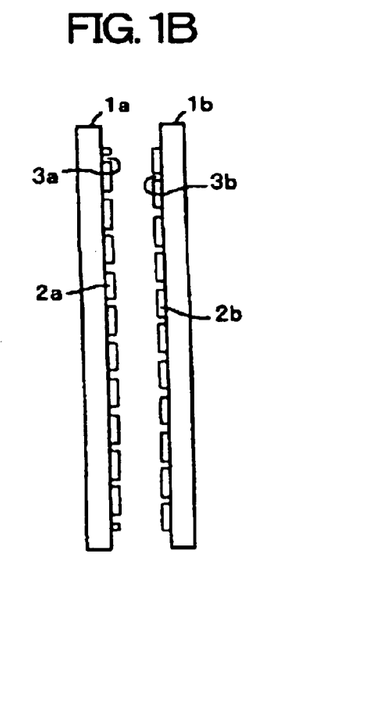

FIGS. 1A and 1B show the basic structure of the LCD element. FIG. 1A is the plan view and FIG. 1B is the cross-sectional view cut along line I–I' in FIG. 1A.

The LCD element comprises a pair of upper substrate 1a and a lower substrate 1b arranged to face each other. A pair of transparent electrodes 2a, 2b are respectively formed on the inner surfaces of the substrates 1a, 1b in order to hold the liquid crystal layer in between so that a display area 10 is constituted by these overlapped electrodes when the LCD element is vertically viewed. Respective electrodes 2a, 2b in the display area 10 have series of roughly rectangular slits 3a, 3b by removing portions of electrodes. When the LCD element is vertically viewed, the rectangular slits 3a, 3b of the respective electrodes 2a, 2b are alternately arranged in the normal direction to the longitudinal direction of series of the slits 3a, 3b in the display area 10.

Since inclined electric fields are generated in the vicinities of edges of the slits 3a, 3b formed in the display area 10, inclined directions of liquid crystals can be controlled by applying a voltage between electrodes 2a, 2b. Inclined electric fields 4 are respectively generated between both edges of the slit 3a and the transparent electrode 2b, and respective generated electric fields are inclined in the opposite directions each other (see broken lines in FIG. 2). In the same manner, electric fields generated between both edges of the slit 3b and the transparent electrode 2a are inclined in the opposite directions each other. As a result, parallel zones sandwiched by neighboring two inclined electric fields are formed such that the parallel zones are alternately inclined in the opposite directions.

Figure 2:
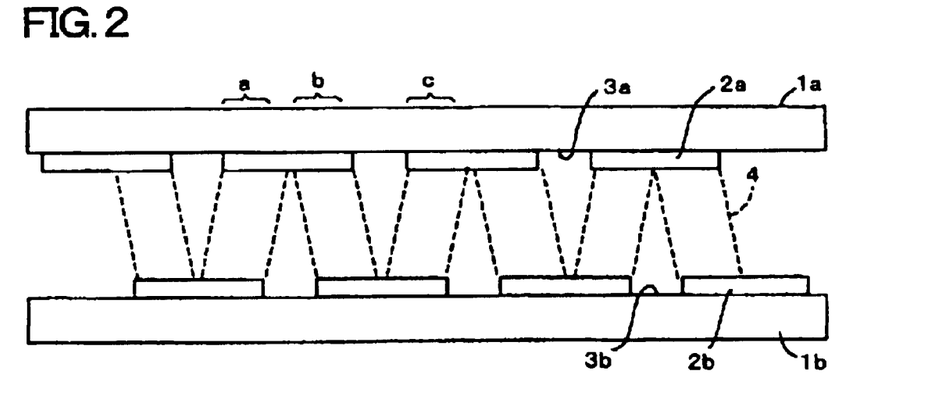
FIG. 2 is a detailed cross-sectional view of the LCD element shown in FIG. 1.

In FIG. 2 the above-mentioned status in the LCD element is illustrated. FIG. 2 is the detailed cross-sectional view of the LCD element cut along the normal line to the longitudinal line of series of the slits shown in FIG. 1.

Figure 3:
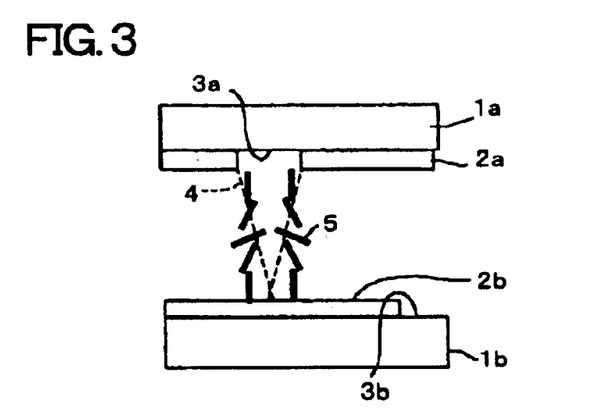
FIG. 3 is a schematic view showing oriented statuses of liquid crystal molecules of the LCD element in FIG. 1, when a voltage is applied.

Vertically oriented liquid crystal molecules are inclined by the inclined electric field 4 in directions as shown in FIG. 3. FIG. 3 is the schematic cross-sectional view showing oriented statuses of liquid crystal molecules, when a voltage is applied. A reference numeral "5" is liquid crystal molecules. FIG. 3 shows orientating statuses of liquid crystal molecules around the slit 3a of the upper substrate. In areas except the slit 3a, generated electric fields are normally orientated to the substrate (not shown in the drawing) by the electrode 2a, but the electric filed 4 at the edge of the slit 3a is inclined since the transparent electrode 2a does not exist at a position of the slit 3a. Since liquid crystal molecules 5 having a negative dielectric anisotropy tend to be oriented normally to an electric field, the liquid crystal molecules are inclined to determined directions against the inclined electric field as shown in FIG. 3. Since electric field inclined in the opposite directions at both sides of a slit, liquid crystals at both sides are inclined in the opposite directions. Liquid crystal molecules in the immediate left neighbor area to a certain slit 3a or 3b are tilted in the opposite direction to a tilting direction of liquid crystal molecules in the immediate right neighbor area to the same slit 3a or 3b. The so-called two-domain orientation structure is realized by the above-mentioned arrangement. In other words, liquid crystal molecules in a small area a in FIG. 2 are tilted leftward (downward in the right direction). On the contrary liquid crystals in a small area b are tilted rightward (downward in the left direction). Again in a small area c liquid crystal molecules are tilted leftward (downward in the tight direction).

Even if series of the slits 3a, 3b on the electrodes 2a, 2b are further increased alternately, the same tilting patterns are obtained repeatedly. In FIG. 2, a most preferable direction to view the small areas a and c is a direction from the upper right, and almost preferable direction to view the small area b is a direction from the upper left. When these small areas a, b and c are viewed from least preferable directions opposite to the above-mentioned directions, visibility is reduced to a minimum value. Consequently, since visibility in the most preferable directions compensates visibility in the least preferable directions, visibility in either direction is not so deteriorated as visibility in conventional LCD elements. Thus visibility of small areas is compensated each other so that visibility in the whole display area is improved.

Figure 4:
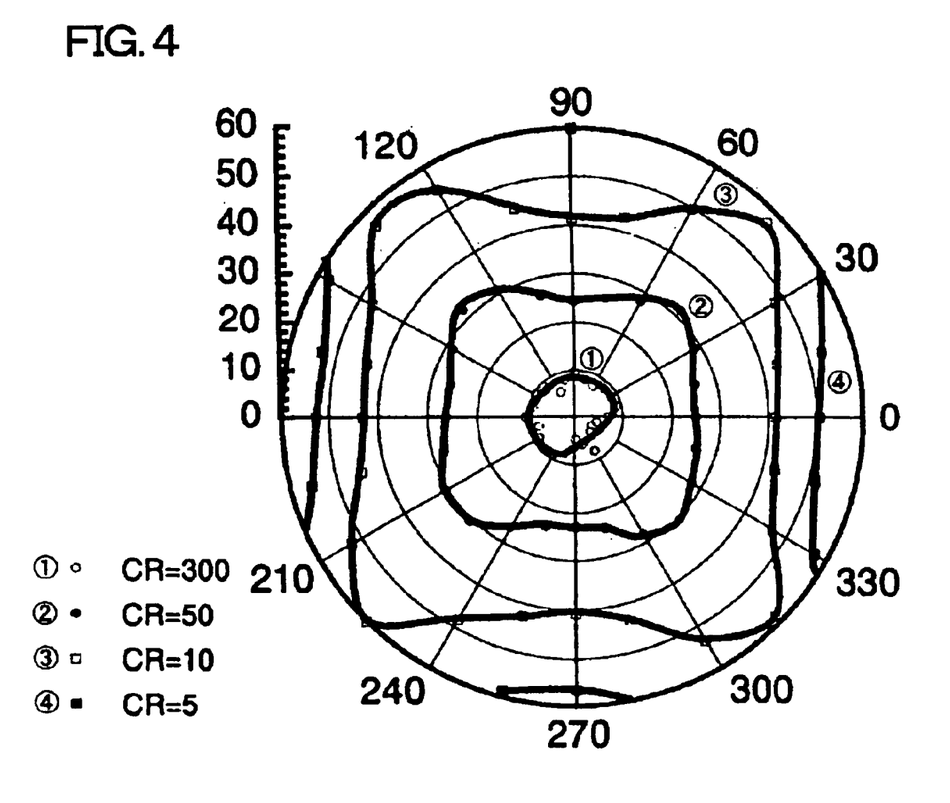
FIG. 4 is a chart illustrating obliquely viewed visibility of the LCD element shown in FIG. 1.

A chart illustrating improved obliquely viewed visibility of the LCD element by the present invention is shown in FIG. 4. In this chart, the longitudinal direction of the slits 3a, 3b correspond to a horizontal direction (a 3 o'clock–9 o'clock direction in FIG. 4). FIG. 4 indicates visibility particularly in a 6 o'clock area in the chart is remarkably Improved by the present invention compared with FIG. 12 showing the chart of the conventional LCD element.

Usually a threshold value of an applied voltage, which can change orienting directions of the liquid crystal molecules 5, against an Inclined electric field is lower than the threshold value against a parallel electric filed. Which means liquid crystal molecules 5 in the vicinities of the slits respond to applied electric fields prior to liquid crystal molecules in other areas so that differently oriented small areas are stably formed by the present invention.

The present invention is carried out to improve vertically oriented LCD element such that the divided slits (which means series of the slits) in the longitudinal direction are formed on the electrodes in the display area for driving liquid crystal molecules by the inclined electric field in order to improve optical properties of the LCD element. For that purpose, dimensions and arranging pitches of the slits are set In ranges suitable to the vertically oriented LCD elements. However, when slits are arranged in the display area of the segment type LCD element without dividing the electrode into sections and without dividing slits, the same slit pattern can not be repeated as can be In the dot-matrix type LCD element, since widths of the display area are different depending on portions of the LCD element. Consequently, positions and dimensions of such slits have to be determined manually. On the other hands, a slit arrangement can be performed together at a time when photo-masks for the electrodes are formed by utilizing the slit dividing (series of slits) method by the present invention, so that man-hours for manufacturing the LCD element are reduced to a larger extent.

The present invention is applicable to the segment display type LCD element and the dot-matrix display type LCD element. Further, it is also applicable to an active matrix type LCD element, which employs a switching element such as a TFT or the like.

Hereinafter the present invention is explained in detail by referring to embodiments. At first manufacturing steps of one of the conventional LCD elements are explained in order to compare with embodiments by the present invention.

A material (SE-1211, produced by Nissan Chemical Industries, Ltd.) for forming a vertically orienting membrane is applied to two substrates on which predetermined display patterns are formed, and substrates are baked afterward. The baked vertical orienting membranes are rubbed in order to determine a tilting direction of liquid crystal molecules. A main sealing material is applied around outer peripheries of the vertically orienting membranes of the substrates and gap controlling materials having a diameter of 4 $\mu$m are sprayed over the vertically oriented membranes. One substrate is laid over the substrate on the other substrate such that the respective display patterns are facing each other and the main sealing materials are cured so that a vacant cell is formed between the two substrates. A liquid crystal cell is completed, when liquid crystal molecules having a double refractive index 0.15 produced by Merck & Co., Inc., are poured into the vacant cell. A visual angle compensation film (VAC-C180 film produced by Sumitomo Chemical Co., Ltd.) and polarizing films are applied to the liquid crystal cell In the manner as illustrated in FIG. 11A. FIG. 12 is a visibility chart of the LCD element obtained in the above-mentioned procedure driven at ⅛ duty.

[Embodiment 1]

In the present embodiment, the segment display type LCD element to which the present invention is applied, is explained.

Figure 5A:
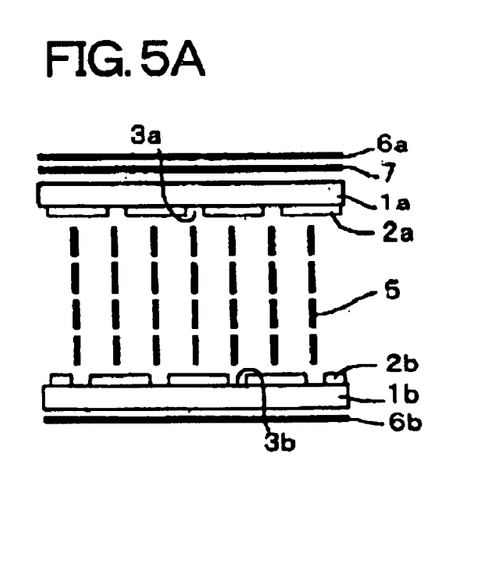
FIG. 5A is a side view and FIG. 5B is a plan view.

Two substrates are prepared in the following manner. Transparent electrodes, portions of which are removed so as to form series of rectangular slits, are formed on both substrates. These respective rectangular slits on one substrate and other substrate are arranged alternately, when both substrates are overlapped such that transparent electrodes of respective substrates face each other. The material (SE-1211 produced by Nissain Chemical Industries, Ltd.) for forming vertically orienting membranes is applied to two substrates on which the above-mentioned transparent electrodes are formed, and substrates are baked afterward. The main sealing material is applied around outer peripheries of the vertically orienting membranes of the substrates and gap controlling materials having a diameter of 4 $\mu$m are sprayed over the vertically orienting membranes. One substrate Is laid over the substrate on the other substrate such that the respective transparent electrodes are facing each other and the main sealing materials are cured so that a vacant cell is formed between the two substrates. A liquid crystal cell is completed, when liquid crystal molecules having a double refractive index of 0.15 produced by Merck & Co., Inc., are poured into the vacant cell. A visual angle compensation film (VAC-C180 film produced by Sumitomo Chemical Co., Ltd.) and polarizing films are applied to the liquid crystal cell in the manner as illustrated in FIG. 5A. A visibility chart of the LCD element obtained in the abovementioned procedure driven at ⅛ duty is illustrated in FIG. 4.

Figure 5B:
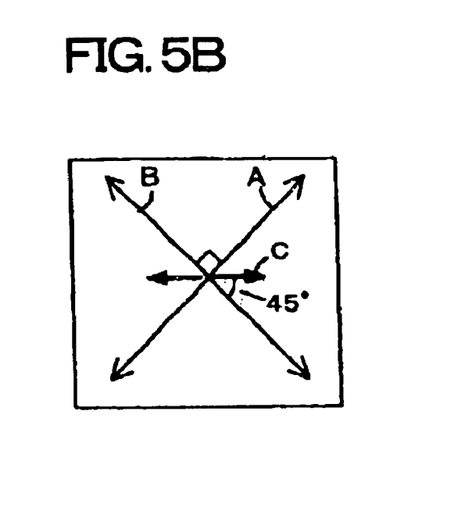

FIGS. 5A and 5B show the structure of the vertically oriented LCD element by the present embodiment. FIG. 5A is the side view and FIG. 5B is the plan view.

Reference characters "1a" and "1b" in" FIG. 5A are an upper glass substrate and a lower glass substrate having transparent electrodes 2a, 2b on which predetermined patterns are formed. Respective transparent electrodes of the substrates are coated with the rubbed vertically orienting membranes. Reference characters "3a" and "3b" are series of the rectangular slits formed on the respective transparent electrodes 2a, 2b by removing portions of the respective transparent electrodes 2a, 2b in a display area. When the LCD element Is vertically viewed, series of the rectangular slits 3a, 3b of the respective electrodes 2a, 2b are alternately arranged in the normal direction to the longitudinal direction of the slits 3a, 3b in the display area.

A reference numeral "5" is liquid crystal molecules held between the two substrates 1a, 1b so that a liquid crystal layer is formed. Reference characters "6a", "6b" are polarizing plates arranged on both sides (outer sides of substrates 1a, 1b) of the liquid crystal cell including the liquid crystal layer. A reference numeral "7" is a visual angle compensation film inserted between the upper polarizing plate 6a and the substrate 1a.

A reference character "A" in FIG. 5B is a transmission axis of the upper polarizing plate 6a and a reference character "B" is a transmission axis of the lower polarizing plate 6b. A tilting direction C of the liquid crystal molecules and the respective transmission axes A, B of the polarizing plates 6a, 6b respectively form an angle of 45 degree. Other constituents are arranged in the same way as shown in FIG. 11A.

Figure 6:
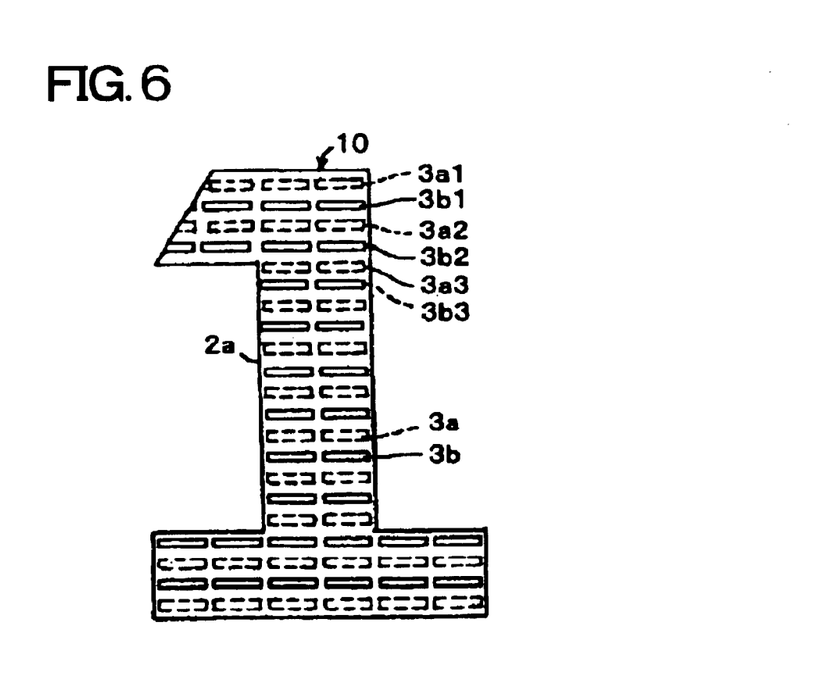
FIG. 6 is a plan view showing an arrangement of a display area of embodiment 1.
Figure 7:
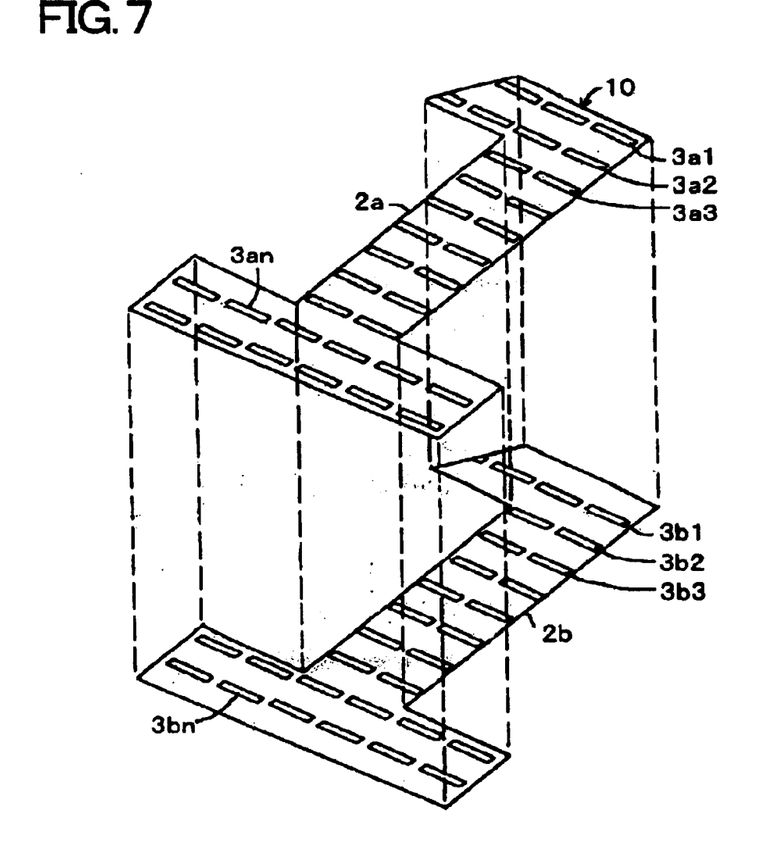
FIG. 7 is a perspective view showing the arrangement of the display area of embodiment 1.

Hereinafter, the present embodiment is explained in more detail. FIGS. 5, 6 and 7 show a constitution of a display area of the present embodiment based on the basic constitution shown in FIG. 2. FIG. 6 is the plan view showing an example of a simple segment type vertically oriented LCD element and FIG. 7 is a corresponding perspective view illustrating relations between the upper/lower electrodes and the slits more clearly.

The vertically oriented LCD element in FIG. 6 displays a numeral "1". An area surrounded by a contour of the numeral "1" is the display area 10 sandwiched by the transparent electrodes 2a, 2b as depicted in FIG. 7. The glass substrates on which the transparent electrodes 2a, 2b are formed, are omitted in these drawings.

Slits 3a (3a1, 3a2, 3a3, □ . . . 3an) are formed on the upper transparent electrode 2a and slits 3b (3b1, 3b2, 3b3, □ . . . 3bn) are formed on the lower transparent electrode 2b at positions which are not overlapped by the slits 3a. When the overlapped upper and lower transparent electrodes 2a, 2b are viewed from above, the display area 10 shows a view as illustrated in FIG. 6. It is desirable to set gaps between neighboring slits almost uniformly in order to obtain visibility as uniformly as possible over the entire display area.

Since the above-mentioned series of the slits 3a, 3b are alternately arranged on the upper and lower electrodes as shown in FIG. 6 and In FIG. 7, the tilting direction C of the liquid crystal molecules is reversed alternately. As explained above, in the display area 10 of a character "1" can be visible well in any direction, since visibility is compensated and visibility depending on viewing directions is reduced by the alternately reversed tilting directions of the liquid crystal molecules 5 in small areas between slits 3a, 3b when a voltage is applied between the two electrodes.

When a width (a length of the slit normal to the longitudinal direction of the slit) of the slits 3a, 3b is set wider to some extent, electric fields around the center portions of the slits are weakened to a extent that the liquid crystal molecules 5 do not respond, so that visibility at center portions of the slits is decreased. In addition, since areas of the transparent electrodes except slits, namely, areas where the liquid crystal molecules respond to the electric field are decreased, namely, the so-called aperture ratio is decreased, a transmittance of the LCD element is decreased. Taking the above-mentioned facts into consideration, it is desirable to set the width of the slits 3a, 3b less than 30 μm.

On the contrary, when the width of the slits is set so narrow, a sufficiently inclined electric filed is not generated, as a result, the feature of the present invention is not materialized sufficiently. Through experiments, it is confirmed that when the width of the slits is set 5 μm for a liquid crystal cell having a thickness of 4 μm, the LCD element does not show a clear two domain orientation. When such liquid crystal cell is observed with the eye particularly from an oblique direction, rough feeling in the display area is felt due to unstable domains. However, when the width of the slits is set 10 μm, the rough feeling is reduced to an acceptable extent, although tilting directions of the liquid crystal molecules 5 are unstable to some extent.

When the width of the slits is set 20 μm, the LCD element shows the clear two domain orientation so that the rough feeling is not felt even when the LCD element is viewed from the oblique direction. Consequently, in the liquid crystal cell having the thickness of 4 μm, a minimum width of the slit should set 10 μm. When the thickness of the liquid crystal cell is reduced, the influence of the inclined electric filed 4 is increased so that the width of the slits 3a, 3b can be set narrower. Consequently, it is concluded that the minimum width of the slits should be set ca. 2.5 times more than the thickness of the liquid crystal cell.

A distance between the two neighboring slits on the upper and lower electrodes (for example, a width of a small area between the two slits 3a1 and 3b1 in FIG. 6) should set wider in order to ensure a sufficient display area. However, the distance should set as narrow as possible, in order to ensure a stable two domain orientation and to prevent the LCD element from showing a two domain pattern when observed with the eye, As the results of experiments, it is confirmed that when the distance between the two slits is set 70 μm for the liquid crystal cell having the thickness of 4 μm, a stability in the two domain is not attained so that the distance should be set less than 60 μm. It is also confirmed, that the two domain pattern is hardly observed with the eye. A minimum value for the distance should be more than 10 μm or more than the width of the slits, since it is desirable to set the aperture ratio as wide as possible.

A length of the slits 3a, 3b should be set as long as possible in order to stabilize the two domain orientation. However, when long slits extending one end to the other of the display area, the slits divide display area or narrow the width of the transparent electrodes 2a, 2b, so that resistances of the electrodes are increased and, consequently, irregularity is caused in a displayed image. In order to prevent these problems, it is desirable to constitute a slit structure such that a long slit is divided by portions of the electrode (some portions of the long slit are bridged by the electrode), in other words a plurality of divided slits are formed along a longitudinal direction.

Figure 8:
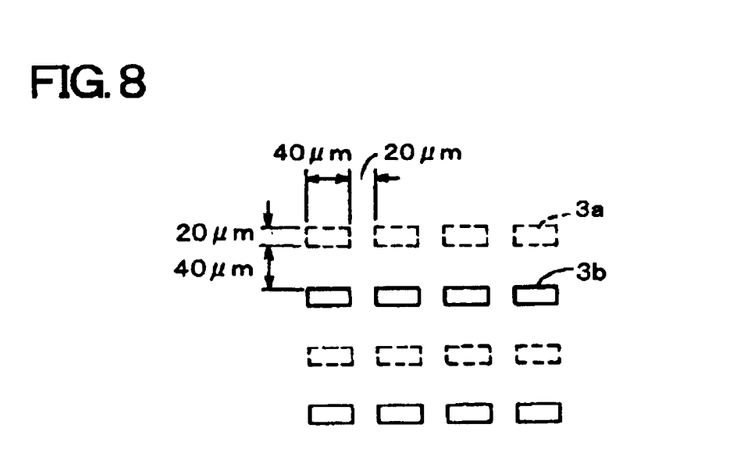
FIG. 8 is an explanatory view showing a slit arrangement of embodiment 1.

FIG. 8 shows the above-mentioned slit arrangement in which typical dimensions confirmed by the experiments are also added. As shown in the drawing, tiny slits 3a, 3b are formed all over the transparent electrodes which form, for example, a character "1" as shown in FIG. 6.

[Embodiment 2]

In the present embodiment, the dot-matrix type LCD element to which the slit arrangement by the present Invention is applied, is explained.

Two substrates are prepared in the same way as in embodiment 1. Transparent electrodes, portions of which are removed so as to form series of rectangular slits, are formed on both substrates. These respective series of the rectangular slits on one substrate and other substrate are arranged alternately, when both substrates are overlapped such that transparent electrodes of the respective substrates face each other. The material (SE-1211 produced by Nissan Chemical Industries, Ltd.) for forming the vertically orienting membrane is applied to two substrates on which the above-mentioned display patterns are formed, and substrates are baked afterward. The main sealing material is applied around outer peripheries of the vertically orienting membranes of the substrates and gap controlling materials having a diameter of 4 µm are sprayed over the vertically orienting membranes. One substrate is laid over the substrate on the other substrate such that the vertically orienting membranes are facing each other and the main sealing materials are cured so that a vacant cell is formed between the two substrates. A liquid crystal cell is completed, when liquid crystal molecules having the double refractive index of 0.15 produced by Merck & Co., Inc., are poured into the vacant cell. The visual angle compensation film (VAC-C180 film produced by Sumitomo Chemical Co., Ltd.) and polarizing films are applied to the liquid crystal cell in the manner as illustrated in FIG. 5A. The LCD element obtained in the above-mentioned procedure shows the similar good visibility (not shown) in a wide range to that of embodiment 1 as illustrated in FIG. 4.

Figure 9:
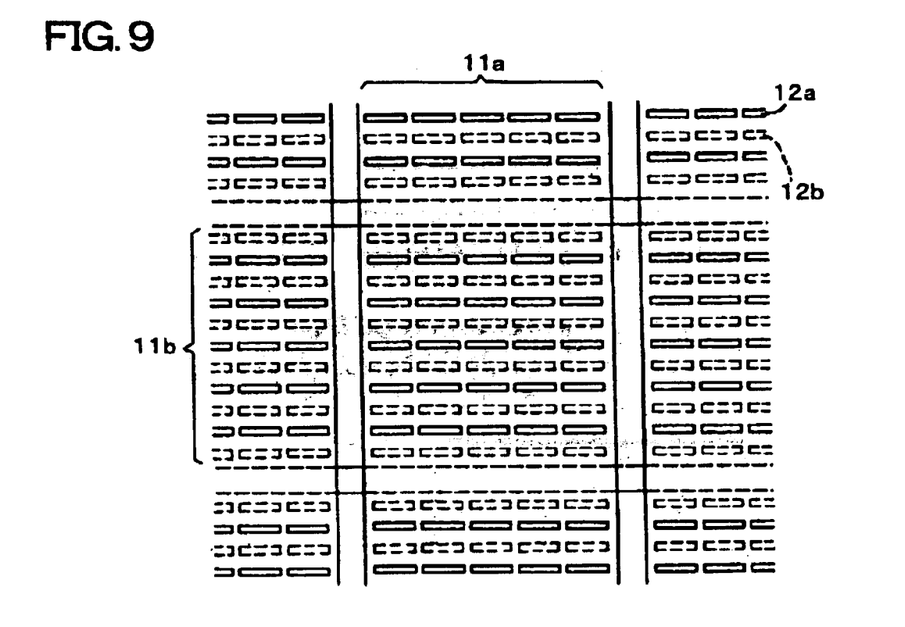
FIG. 9 is a plan view showing a slit arrangement of embodiment 2.

Hereinafter, the present embodiment is .explained more in detail. FIG. 9 is the plan view showing the slit arrangement of the present embodiment employing the same slit structure as shown in FIG. 2. In FIG. 9, a reference character "11a" is segment electrodes (transparent electrodes) formed on an upper substrate and a reference character "11b" is common electrodes (transparent electrodes) formed on a lower substrate. A reference character "12a" is series of slits formed on the segment electrodes 11a and a reference character "12b" is series of slits formed on the common electrodes 11b. The slits 12a, 12b have the same shape and are arranged in the same manner as the slits 3a, 3b in embodiment 1.

As shown in FIG. 9, series of the slits 12a, 12b in the dot-matrix type LCD element are formed only on portions where a laterally comb-like structured electrode (the segment electrodes) and a vertically comb-like structured electrode (the common electrodes),overlap each other. Series of the slits 12a, 12b are alternately arranged on the upper and lower electrodes in the same way as in the segment type LCD element. Consequently, since the tilting directions of the liquid crystal molecules are reversed alternately, namely, the LCD element has the two domain structure, tilting directions of the liquid crystal molecules in small areas between slits 12a, 12b are alternately reversed when a voltage is applied between the two electrodes. As a result since visibility on the whole is compensated by the alternately reversed tilting directions of the liquid crystal molecules, visibility depending on particular viewing directions is reduced so that the LCD element can be viewed well from any direction.

A preferable width of series of the slits 12a, 12b, a preferable horizontal distance between the two neighboring slits 12a, 12b on the upper and lower electrodes and a preferable length of series of the slits 12a, 12b are the same values as in the case of the segment display (embodiment 1).

It is important to arrange series of the slits 12a, 12b as follows. Series of the slits 12a on the upper electrode (the segment electrode) should be formed in the normal direction to the longitudinal direction of the upper electrode and series of slits the 12a should be arranged at both ends of the longitudinal direction of the upper electrode, when the LCD element is vertically viewed.

[Embodiment 3]

Figure 10:
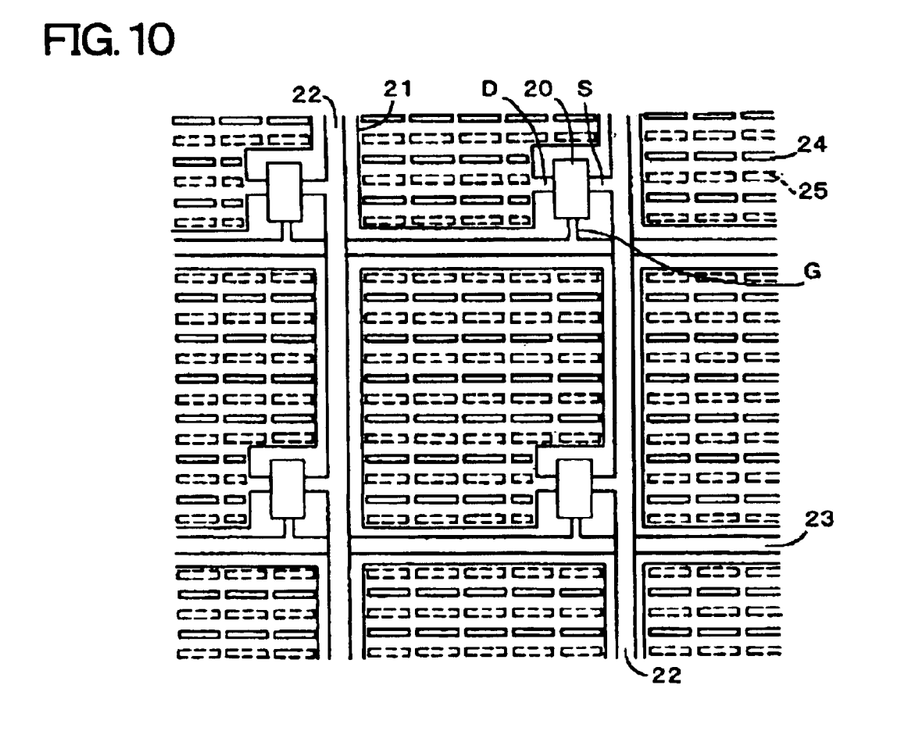
FIG. 10 is a plan view showing a slit arrangement of embodiment 3.

In the present embodiment, the TFT active matrix type LCD element to which the slit arrangement by the present invention is applied, is explained. FIG. 10 is the plan view showing a slit arrangement of the present embodiment and also showing several pixels of the TFT active matrix type LCD apparatus. Since in these days active matrix type LCD elements are usually employed, detailed explanations on their structures are omitted.

As shown in FIG. 10, a plurality of TFT elements 20 made from amorphous silicon or the like and pixel electrodes 21 made from ITO or the like are formed on a first glass electrode (not shown in the drawing). Further, source lines (signal lines) 22 and gate lines (scanning lines) 23 are respectively connected to source electrodes S and gate electrodes G of the TFT elements. The TFT elements 20 drive the pixel electrode 21 via drain electrodes D.

Vertically orienting membranes (not shown in the drawing) are formed on the pixel electrodes 21. Common electrodes are formed on a second transparent glass substrate and vertically orienting membranes are formed on the common electrodes. The second glass substrate is laid on the first glass substrate such that two substrates sandwich a vertically oriented liquid crystal layer and vertically orienting membranes of the two substrates face each other.

Series of slits 24 depicted in a solid line, are formed on the pixel electrodes 21 by removing portions of the pixel electrodes. Series of slits 25 depicted in a broken line, are formed on the common electrodes employed as counter electrodes to the pixel electrodes. Series of the slits 24, 25 formed on the upper and lower glass substrates are arranged alternately, when the substrates are viewed vertically.

A cross-sectional view of the slit structure shown in FIG. 10 cut along a normal line to a longitudinal line of the slits, basically corresponds to the structure shown in FIG. 2. Alternately arranged slits 24, 25 on upper and lower electrodes attain the same effects as described in embodiments 1 and 2.

The following point should be considered in the present embodiment. Both end slits in a normal direction to a longitudinal direction of series of the slits should be formed on the common electrode in the same manner as the dot-matrix type LCD element in embodiment 2.

The present invention can apply to different active matrix structures from the above-described example. The present invention is not limited to embodiments described by referring to the drawings, but the present Invention can be modified or improved by a person having ordinary skill in the art based on the above-mentioned disclosure.

In other words, the display area of the LCD element by the present invention can take any type of display area such as the segment display type, the simple matrix driven dot-matrix display type, a type combined with the segment display type and the simple matrix driven dot-matrix display type or the active matrix driven dot-matrix display type.

Any of the above-explained embodiments can improve obliquely viewed visibility so that almost uniform visibility in any viewing direction is attained, consequently, a vertically oriented LCD element of higher quality in its visibility can be realized.

In other words, since alternately tilting directions of the liquid crystal molecules are formed in a small area simultaneously when a voltage is applied between the two electrodes by alternately arranged series of the slits on upper and lower transparent electrodes, visibility In the small area is compensated and visibility difference depending on the viewing direction is reduced, as a result visibility in any direction is enhanced, which means displaying quality of the LCD element is raised.

What is claimed is:

1. A liquid crystal display element comprising:

a pair of substrates arranged parallel to each other;

first and second transparent electrodes, the first electrode being formed on one substrate and the second electrode being formed on the other substrate of the pair, the electrodes having predetermined patterns formed on the respective substrates and forming a display area;

perpendicularly oriented membranes respectively formed on the transparent electrodes; and a liquid crystal layer consisting of the liquid crystal molecules sandwiched by the substrates, wherein:

the pair of substrates being arranged such that the respective first and second transparent electrodes face each other;

a series of nearly rectangular slits are formed on the respective first and second transparent electrodes by removing portions of the electrodes in the display area formed by electrodes; and the series of the slits on the first of the transparent electrodes are alternately arranged with respect to the series of slits on the facing second electrode in a normal direction to a longitudinal direction of the series of the slits, when the substrates are viewed perpendicular to the substrates vertically.

2. The liquid crystal display element according to claim 1, wherein: a width of said slits in the normal direction to the longitudinal direction of said slits is set more than 10 $\mu$m, but less than 30 $\mu$m.

3. The liquid crystal display element according to claim 1, wherein: a width of said slits in the normal direction to the longitudinal direction of said slits is set 2.5 times more than a thickness of said liquid crystal layer.

4. The liquid crystal display element according to claim 1, wherein: a distance in a direction parallel to the substrates between two neighboring alternately arranged slits in the normal direction to the longitudinal direction of the slits is set more than 10 $\mu$m, but less than 60 $\mu$m.

5. The liquid crystal display element according to claim 1, wherein: a distance in a direction parallel to the substrates between two neighboring alternately arranged slits in the normal direction to the longitudinal direction of the slits is set more than the width of the slits, but less than 60 $\mu$m.

6. The liquid crystal display element according to one of claims 1 to 5, wherein: said display area is a segment display area.

7. The liquid crystal display element according to one of claims 1 to 5, wherein: said display area is a dot-matrix display area driven by a simple matrix driving method.

8. The liquid crystal display element according to claim 7, wherein: slits at both ends of a dot in a normal direction to the longitudinal direction of said slits are formed on the electrode arranged normal to the longitudinal direction of said slits.

9. The liquid crystal display element according to one of claims 1 to 5, wherein: the display area is a an area comprising a combined segment display area and a dot-matrix display area driven by a simple matrix driving method.

10. The liquid crystal display element according to claim 9, wherein: slits at both ends of a dot in a normal direction to the longitudinal direction of said slits are formed on the electrode arranged normal to the longitudinal direction of said slits.

11. The liquid crystal display element according to one of claims 1 to 5, wherein: the display area is a dot-matrix display area driven by an active matrix.

12. The liquid crystal display element according to claim 11, wherein: outermost slits in the normal direction to the longitudinal direction of said slits are formed on a common electrode facing a certain pixel electrode.

13. The liquid crystal display element according to claim 1, wherein: at least one of the slits is divided into a plurality of slits in the longitudinal direction of the one slit.

* * * * *